United States Patent
Buijs et al.

(10) Patent No.: US 11,026,772 B2
(45) Date of Patent: Jun. 8, 2021

(54) DRIVE TRAIN ASSEMBLY FOR AN ORAL CARE DEVICE

(71) Applicant: KONINKLIJKE PHILIPS N.V., Eindhoven (NL)

(72) Inventors: Arnold Buijs, Eindhoven (NL); Jan Willem Bruggers, Horst (NL); Johannes Antonius Van Rooij, Best (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 264 days.

(21) Appl. No.: 16/306,141

(22) PCT Filed: Jun. 12, 2017

(86) PCT No.: PCT/EP2017/064222
§ 371 (c)(1),
(2) Date: Nov. 30, 2018

(87) PCT Pub. No.: WO2017/220355
PCT Pub. Date: Dec. 28, 2017

(65) Prior Publication Data
US 2020/0323613 A1    Oct. 15, 2020

Related U.S. Application Data

(60) Provisional application No. 62/354,349, filed on Jun. 24, 2016.

(51) Int. Cl.
*F16F 1/16*     (2006.01)
*A61C 17/34*    (2006.01)
(Continued)

(52) U.S. Cl.
CPC ........ *A61C 17/222* (2013.01); *A61C 17/3481* (2013.01); *A46B 5/0095* (2013.01); *A46B 2200/1066* (2013.01); *A61C 17/221* (2013.01)

(58) Field of Classification Search
CPC ... A46B 5/0095; A61C 17/3481; A61C 17/34; A61C 1/185; A61C 17/222; F16F 1/14; F16F 1/025; F16F 1/16
See application file for complete search history.

(56) References Cited

U.S. PATENT DOCUMENTS

| 5,399,089 A | 3/1995 | Eichman |
| 7,730,569 B2 | 6/2010 | Grez |

(Continued)

FOREIGN PATENT DOCUMENTS

| CN | 205226192 U | 5/2016 |
| EP | 1734889 B1 | 8/2009 |

(Continued)

OTHER PUBLICATIONS

Toglefritz: "Design for a 3D Printed Culinary Centrifuge"; Downloaded From http:/www.hatsfieldscott.com, 2016, 5 page document.

(Continued)

*Primary Examiner* — Shay Karls

(57) ABSTRACT

A drive train assembly (22) for an oral care device (10) having a housing (12), comprising: a plurality of elongated leaf springs (50) symmetrically disposed around the circumference of the drive train assembly, each of the plurality of elongated leaf springs secured at both ends; and a ring (46) encircling the plurality of elongated leaf springs, wherein the ring is fixedly connected to each of the plurality of elongated leaf spring assemblies and fixedly connected to the housing of the oral care device.

14 Claims, 5 Drawing Sheets

(51) Int. Cl.
    *A61C 17/22*           (2006.01)
    *A46B 5/00*            (2006.01)

(56)               References Cited

U.S. PATENT DOCUMENTS

| | | |
|---|---|---|
| 9,022,961 B2 | 5/2015 | Fougere et al. |
| 9,062,736 B2 | 6/2015 | De Jong |
| 9,254,033 B1 | 2/2016 | Huang |
| 2008/0028547 A1 | 2/2008 | Miller et al. |
| 2008/0086827 A1 | 4/2008 | Waguespack |
| 2009/0019651 A1* | 1/2009 | Grez ............... A61C 17/222 15/22.1 |
| 2009/0306717 A1 | 12/2009 | Kercher et al. |
| 2010/0017984 A1* | 1/2010 | Yamada ............ A46B 5/0079 15/144.1 |

FOREIGN PATENT DOCUMENTS

| | | |
|---|---|---|
| JP | 2002326025 A | 11/2002 |
| RU | 2387459 C2 | 4/2010 |
| WO | 2009156886 A1 | 12/2009 |

OTHER PUBLICATIONS

Vasquez et al: "3D Printing Pneumatic Device Controls With Variable Activation Force Capabilities"; CHI'15, Apr. 2015, pp. 1-10.

\* cited by examiner

Section 1

Section 2

Section 3

DRIVE TRAIN ASSEMBLY FOR AN ORAL CARE DEVICE

CROSS-REFERENCE TO PRIOR APPLICATIONS

This application is the U.S. National Phase application under 35 U.S.C. § 371 of International Application No. PCT/EP2017/064222, filed on Jun. 12, 2017, which claims the benefit of U.S. Provisional Patent Application No. 62/354,349, filed on Jun. 24, 2016. These applications are hereby incorporated by reference herein.

FIELD OF THE INVENTION

The present disclosure is directed generally to a personal care device drive train arrangement having multiple leaf springs.

BACKGROUND

Proper tooth brushing, including length and coverage of brushing, helps ensure long-term dental health. Many dental problems are experienced by individuals who either do not regularly brush their teeth or who do so inadequately, especially in a particular area or region of the oral cavity. Among individuals who do brush regularly, improper brushing habits can result in poor coverage of brushing and thus surfaces that are not adequately cleaned during a cleaning session, even when a standard brushing regimen is followed. Electric cleaning devices, such as electric toothbrushes, have been shown to greatly increase the efficacy of a cleaning session.

These electric cleaning devices, including power toothbrushes, shavers, and similar devices, have a motor, such as a mechanical, electromechanical, magnetic motor, that engages a drive train in order to drive a brushhead in an oscillating, reciprocating, or other pattern. One type of drive train arrangement uses a spring mounted at both ends. Some configurations have a node point located approximately mid-length between the two ends, and some springs have a V-shape.

These spring arrangements, however, are prone to failure as a result of fretting fatigue in which repeated forces at the interface of the clamped ends of the spring causes stresses on the spring and clamp. Over time, this can lead to failure of one or more of the parts. Additionally, spring arrangements where the spring is mounted at both ends requires numerous different parts, which increases component costs, manufacturing costs, and production time.

Accordingly, there is a continued need for personal care device drive trains arrangements having fewer parts and including an integrated leaf spring assembly, resulting in increased resilience to stress and fatigue.

SUMMARY OF THE INVENTION

The present disclosure is directed to inventive drive train assemblies comprising a plurality of integrated leaf springs. Applied to an electric or power personal care device such as an electric toothbrush or shaver, the inventive systems provide a one- or two-piece drive train assembly that is more efficient and more resistant to stress. The drive train assembly features 3D-printed metal construction with three elongated leaf springs and a fixed, centrally-located ring.

Generally in one aspect, a drive train assembly for an oral care device is provided. The drive train assembly includes: a plurality of elongated leaf springs symmetrically disposed around the circumference of the drive train assembly, each of the plurality of elongated leaf springs secured at both ends; and a ring encircling the plurality of elongated leaf springs, wherein the ring is fixedly connected to each of the plurality of elongated leaf springs and fixedly connected to the housing of the oral care device.

According to an embodiment, the drive train assembly further comprises a first end mount and a second end mount, wherein the plurality of elongated leaf springs are secured at a first end to the first end mount and at a second end to the second end mount.

According to an embodiment, the drive train assembly further comprises a mount configured to engage a brushhead assembly.

According to an embodiment, the ring is fixedly connected to each of the plurality of elongated leaf springs at approximately the middle of the length of each leaf spring.

According to an embodiment, the drive train assembly comprises three symmetrical leaf spring assemblies.

According to an embodiment, the plurality of elongated leaf springs comprises titanium.

According to an embodiment, the drive train assembly comprises a single integral component manufactured by 3D printing.

According to an aspect an oral care device is provided. The oral care device includes a housing, and a drive train assembly comprising a plurality of elongated leaf springs symmetrically disposed around the circumference of the drive train assembly, each of the plurality of elongated leaf springs secured at both ends; and a ring encircling the plurality of elongated leaf springs, wherein the ring is fixedly connected to each of the plurality of elongated leaf springs and fixedly connected to the housing of the oral care device.

According to an aspect a 3D-printed drive train assembly for an oral care device is provided. The 3D-printed drive train assembly includes: a plurality of elongated leaf springs symmetrically disposed around the circumference of the drive train assembly, each of the plurality of elongated leaf springs secured at both ends; a first end mount and a second end mount, wherein the plurality of elongated leaf springs are secured at a first end to the first end mount and at a second end to the second end mount; a brushhead mount extending from the second end mount and configured to engage a brushhead assembly; and a ring encircling the plurality of elongated leaf springs, wherein the ring is fixedly connected to each of the plurality of elongated leaf springs at approximately the middle of the length of each leaf spring, and is further fixedly connected to the housing of the oral care device.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a device for a drive train assembly for an electric personal care device. More generally, Applicant has recognized and appreciated that it would be beneficial to provide a one- or two-piece spring assembly that is more efficient and more resistant to stress. Accordingly, the systems described or otherwise envisioned herein provide a personal care device, such as an electric toothbrush or shaver, with a drive train spring assembly comprising multiple leaf springs surrounded by a fixed, centrally-located ring. According to an embodiment, the drive train spring assembly features 3D-printed metal construction.

A particular goal of utilization of the embodiments and implementations herein is to provide a drive train spring assembly for an oral care device such as, e.g., a Philips Sonicare™ toothbrush (manufactured by Koninklijke Philips Electronics, N.V.), although the assembly may be utilized with many other personal care devices.

Figure 1:
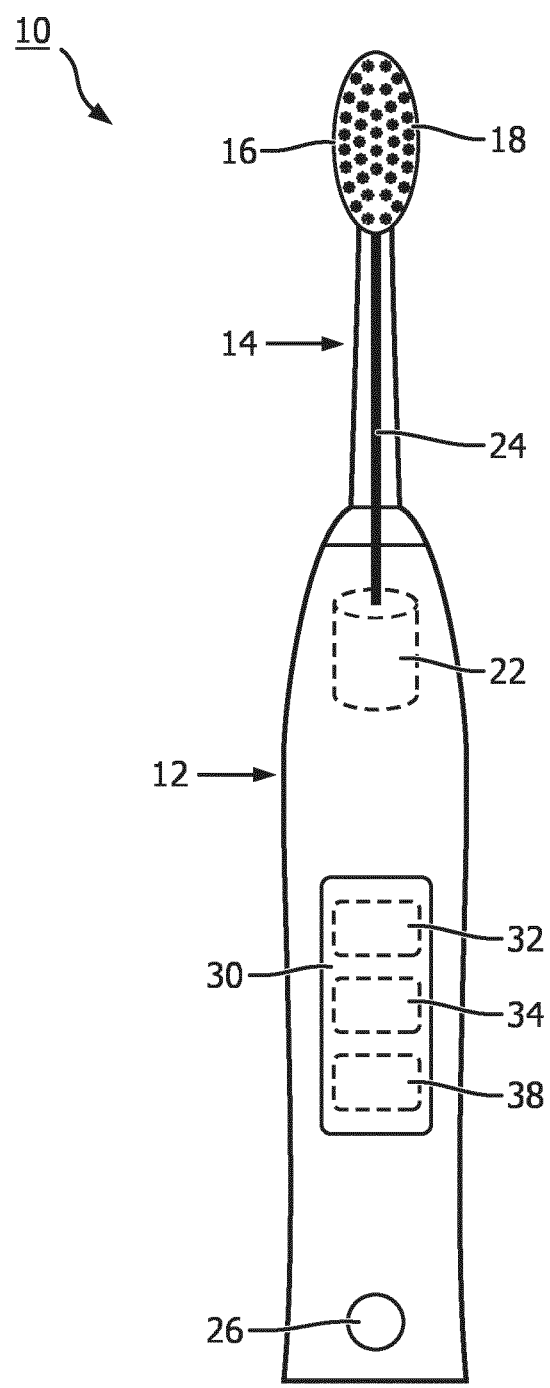
FIG. 1 is a schematic representation of an oral care device, in accordance with an embodiment.

Referring to FIG. 1, in one embodiment, an oral care device 10 is provided that includes a body portion housing 12 and a brush head member 14 mounted on the body portion. Brush head member 14 includes at its end remote from the body portion a brush head 16. Brush head 16 includes a bristle face 18, which provides a plurality of bristles. According to an embodiment, the bristles extend along an axis substantially perpendicular to the head's axis of elongation, although many other embodiments of the brush head and bristles are possible.

Head member 14 is mounted so as to be able to move relative to the body portion housing 12. The movement can be any of a variety of different movements, including vibrations or rotation, among others. According to one embodiment, head member 14 is mounted to the body so as to be able to vibrate relative to body portion housing 12, or, as another example, brush head 16 is mounted to head member 14 so as to be able to vibrate relative to body portion housing 12. The brush head member 14 can be fixedly mounted onto body portion housing 12, or it may alternatively be detachably mounted so that head member 14 can be replaced with a new one when the bristles or another component of the device are worn out and require replacement.

The body portion housing 12 incorporates a drive train 22 for generating movement and a transmission component 24 for transmitting the generated movements to brush head member 14. For example, drive train 22 comprises a motor or electromagnet(s) that generates movement of a spring assembly, which is subsequently transmitted to the brush head member 14. Drive train 22 can include components such as a power supply, an oscillator, and one or more electromagnets, among other components. In this embodiment the power supply comprises one or more rechargeable batteries, not shown, which can, for example, be electrically charged in a charging holder in which oral care device 10 is placed when not in use.

The body portion housing 12 is further provided with a user input 26 to activate and de-activate drive train 22. The user input 26 allows a user to operate the oral care device 10 for example to turn the oral care device 10 on and off. The user input 26 may, for example, be a button, touch screen, or switch.

The body portion housing of the device also comprises a controller 30. Controller 30 may be formed of one or multiple modules, and is configured to operate the oral care device 10 in response to an input, such as input obtained via user input 26. Controller 30 can comprise, for example, a processor 32 and a memory 34, and can optionally include a connectivity module 38. The processor 32 may take any suitable form, including but not limited to a microcontroller, multiple microcontrollers, circuitry, a single processor, or plural processors. The memory 34 can take any suitable form, including a non-volatile memory and/or RAM. The non-volatile memory may include read only memory (ROM), a hard disk drive (HDD), or a solid state drive (SSD). The memory can store, among other things, an operating system. The RAM is used by the processor for the temporary storage of data. According to an embodiment, an operating system may contain code which, when executed by controller 30, controls operation of the hardware components of oral care device 10. According to an embodiment, connectivity module 38 transmits collected sensor data, and can be any module, device, or means capable of transmitting a wired or wireless signal, including but not limited to a Wi-Fi, Bluetooth, near field communication, and/or cellular module.

Figure 2:
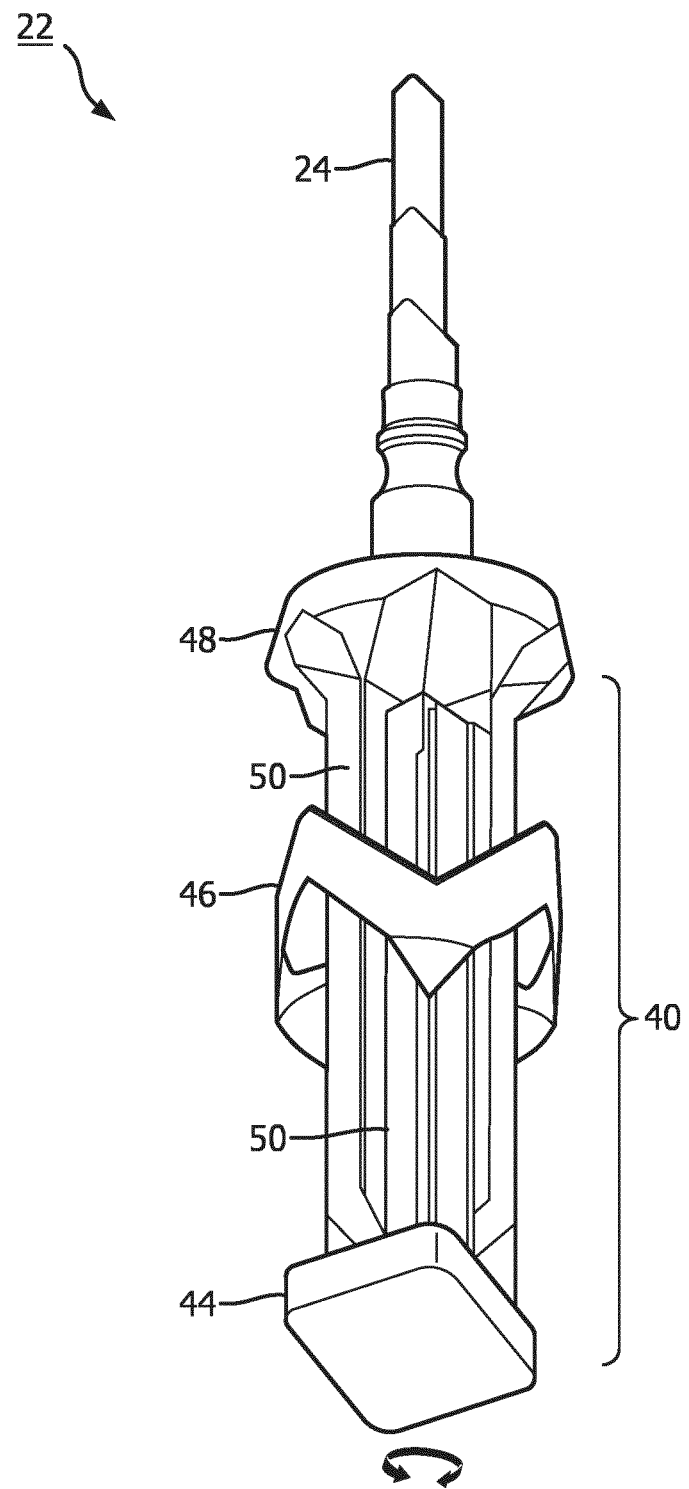
FIG. 2 is a schematic representation of a drive train assembly of an oral care device, in accordance with an embodiment.

Referring to FIG. 2, in one embodiment, is a drive train assembly 22 with a leaf spring region 40. The drive train assembly 22 comprises a first end mount 44, which is driven by a motor (not shown). The drive train assembly also includes a second end mount 48. Extending from end mount 48 is a transmission component 24 for attaching a head member 14. A series of leaf spring assemblies 50 are fixedly mounted at the respective ends thereof to end mounts 44 and 48. Mounted to approximately the center point (node point) of the leaf spring assemblies 50 is a fixed ring 46, which is fixedly attached to the housing 12 of the oral care device at one or more of its outer edges thereof.

Figure 3:
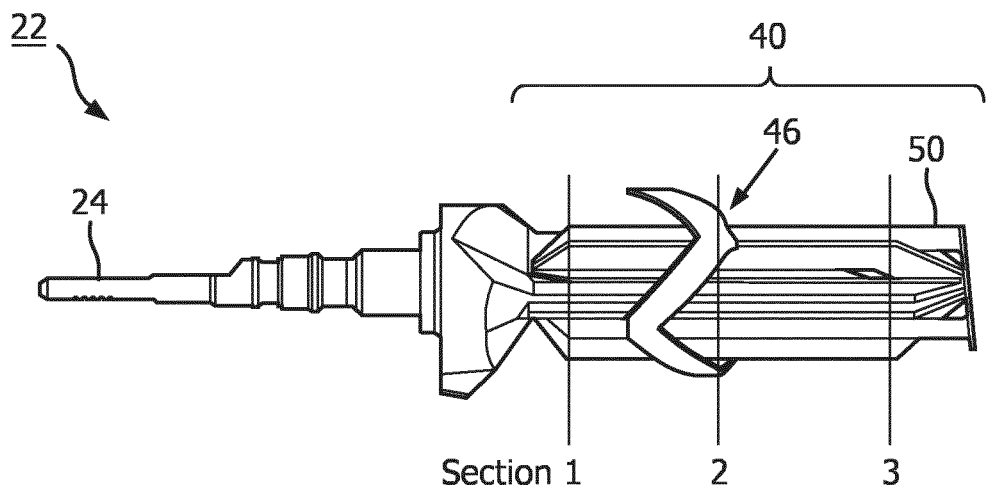
FIG. 3 is a schematic representation of a drive train assembly of an oral care device, with cross-sectional views, in accordance with an embodiment.
Figure 3:
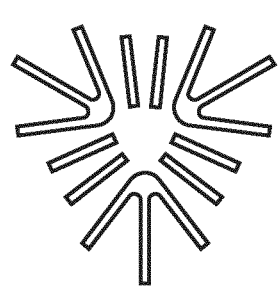
Figure 3:
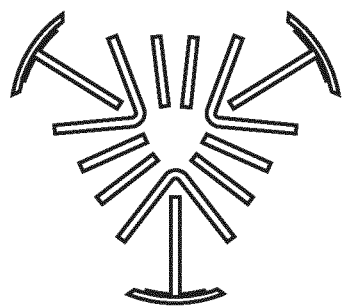
Figure 3:
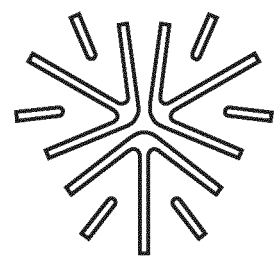

Referring to FIG. 3, in one embodiment is a drive train assembly 22 with a leaf spring region 40. Three leaf spring assemblies 50 A, B, and C (see FIG. 5) are arranged lengthwise around the circumference of the drive train assembly 22. A fixed ring 46 is mounted to approximately the center point (node point) of the leaf spring assemblies 50. A cross-section of the drive train assembly 22 is taken at three different points 1, 2, and 3 corresponding to Section 1, Section 2, and Section 3 in FIG. 3, respectively. The cross-sections display the arrangement of the leaf spring assemblies 50 and fixed ring 46 around the circumference of the drive train assembly 22 at each of Section points 1, 2, and 3, respectively. According to an embodiment, the leaf spring region 40 is symmetrical around the circumference of drive train assembly 22, as shown in FIGS. 3 and 5.

Figure 4:
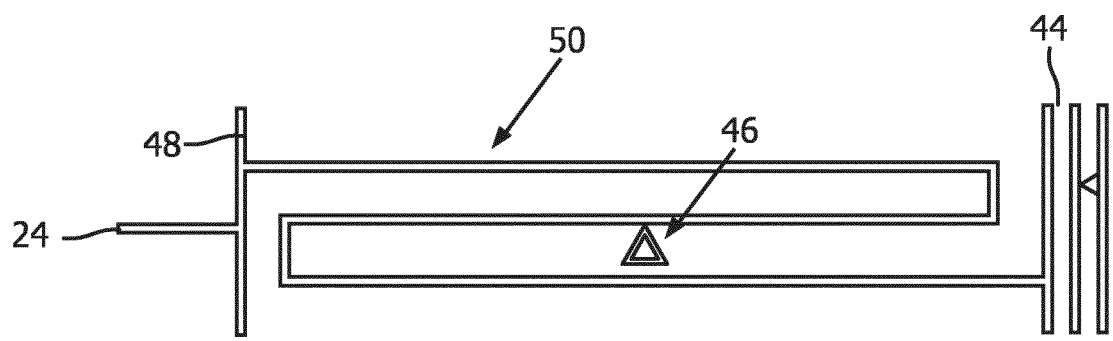
FIG. 4 is a schematic representation of a leaf spring for the drive train assembly of an oral care device, in accordance with an embodiment.

The geometry of each of the leaf spring assemblies 50 along their length is shown in FIG. 4 according to one embodiment, where each leaf spring is attached at a first end mount 44 and a second end mount 48 of the drive train assembly 22. According to this embodiment, the leaf spring assemblies can be much longer than traditional leaf springs in power toothbrush spring assemblies. For example, the leaf spring assemblies 50 depicted in FIG. 3 can be as much as 2.5 times longer than the traditional leaf springs.

Although the leaf spring assemblies 50 in FIGS. 2-4 are depicted as being substantially straight, they can also be any shape. For example, one or more of the leaf spring assemblies 50 as described or otherwise envisioned herein can be straight, curved, curvilinear, and/or any other shape. Further, the leaf spring assemblies 50 can be of the same or variable thickness along their length. According to one embodiment, the leaf spring assemblies 50 can be, for example, a single thickness of approximately 0.35 to 0.50 mm over their length, but they can also comprise a variety of different thicknesses along their length.

Figure 5:
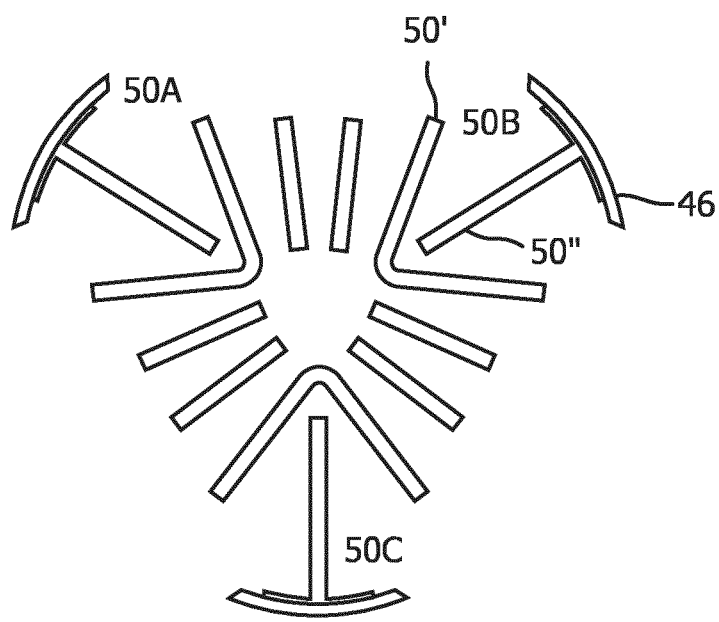
FIG. 5 is a schematic representation of a cross-section of a drive train assembly of an oral care device, in accordance with an embodiment.

Referring to FIG. 5, in one embodiment, is a cross-section at Section point 2 of the drive train assembly 22 from FIG. 3. The leaf spring region 40 is symmetrical and comprises leaf spring assembly 50A, leaf spring assembly 50B, and leaf spring assembly 50C, where each is approximately 120 degrees apart. Each of the leaf spring assemblies comprises a leaf spring 50 with a first segment 50' and a second segment 50". Each leaf spring assembly 50 also comprises a connection to the fixed ring 46.

Figure 6:
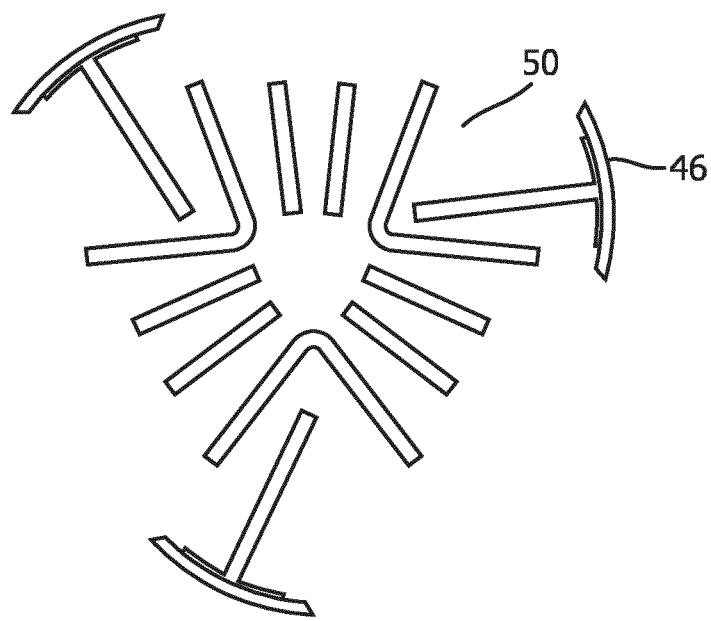
FIG. 6 is a schematic representation of a cross-section of a drive train assembly of an oral care device, in accordance with an embodiment.

Referring to FIG. 6, in one embodiment, is a cross-section at Section point 2 of the drive train assembly 22 from FIGS. 3 and 4 upon rotation of the drive train. The fixed ring 46 is fixed and stationary, and the leaf spring assemblies 50 flex until metal-to-metal contact causes the rotation to stop, as shown in FIG. 6.

Figure 7:
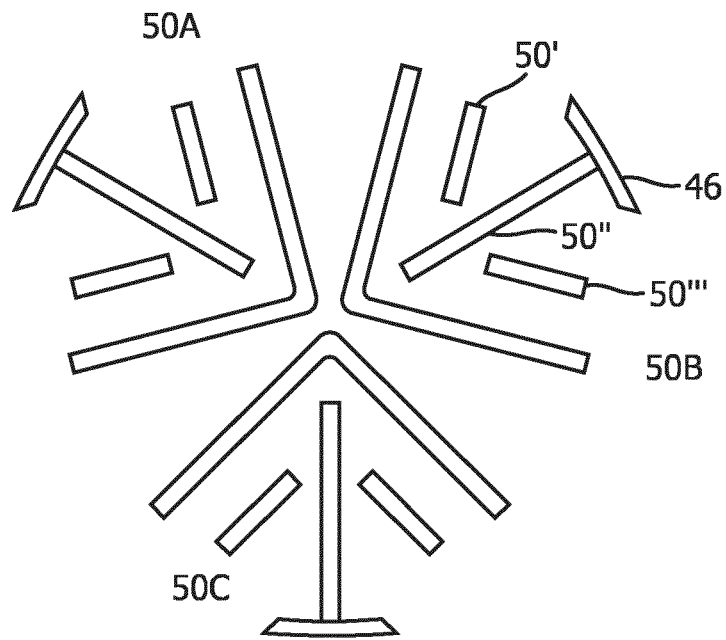
FIG. 7 is a schematic representation of a cross-section of a drive train assembly of an oral care device, in accordance with an embodiment.
Figure 8:
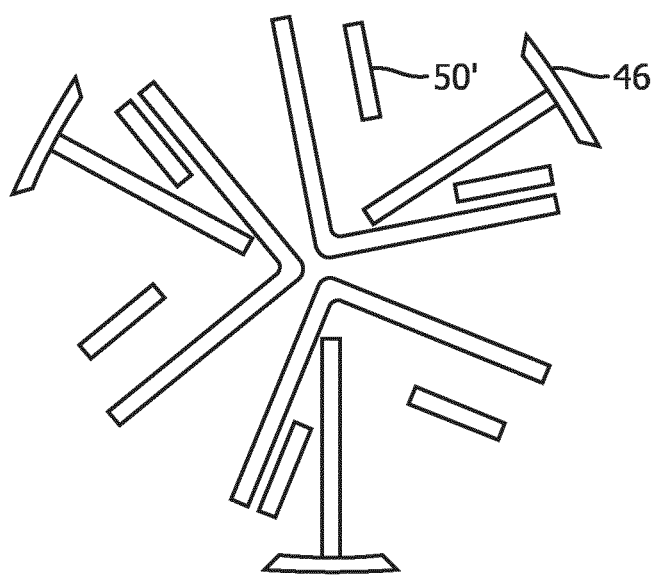
FIG. 8 is a schematic representation of a cross-section of a drive train assembly of an oral care device, in accordance with an embodiment

Referring to FIGS. 7 and 8, according to another embodiment, is a cross-section of another configuration of drive train assembly 22. This drive train assembly comprises a different configuration, although in this embodiment the leaf spring region 40 is symmetrical and comprises leaf spring assembly 50A, leaf spring assembly 50B, and leaf spring assembly 50C, where each is approximately 120 degrees. Each of the leaf spring assemblies comprises a leaf spring member 50 with a first segment 50', a second segment 50", and a third segment 50'. Each leaf spring assembly 50 also comprises a connection to the fixed ring 46. Accordingly, the configuration of drive train 22, and thus the cross-section of drive train 22, and adopt many different configurations. FIG. 8 is a cross-section of the drive train assembly 22 from FIG. 7 upon rotation of the drive train. The fixed ring 46 is fixed and stationary, and the leaf spring assemblies 50 flex until metal-to-metal contact causes the rotation to stop, according to an embodiment.

According to an embodiment, the frequency mode of the drive train assembly 22 may comprise small peaks, which may result in negative or undesirable vibrations within or on the oral care device 10. These undesirable vibrations can affect the functioning of the drive train assembly 22 and the functioning of the oral care device 10, and can significantly lower the lifespan and/or efficiency of the oral care device.

In order to resolve the undesirable vibrations of the drive train assembly 22, the drive train assembly 22 and/or oral care device can comprise a damping gel. The damping gel can be any gel or polymer suitable to reduce, absorb, or otherwise minimize vibrations or other undesirable movement or motion of the leaf springs or other components of the oral care device. According to an embodiment, one or both ends of the leaf springs 50 comprise a damping gel component. For example, the first and/or second end of the one or more leaf springs can comprise a gel holder filled with a damping gel configured and positioned to at least partially resolve the undesirable vibrations of the drive train assembly 22.

According to one embodiment, the drive train assembly 22 is manufactured using a 3D printing technique. The 3D printing method reduces the number of parts in the drive train assembly 22 from as many as 18 to as few as one or two, thereby reducing cost and manufacturing time while increasing durability and reliability. The drive train assembly 22 can be manufactured from a wide variety of materials, including but not limited to plastic, metal, and combinations thereof. According to an embodiment, the drive train assembly 22 is composed in part or in whole of titanium in order to provide sufficient resilience and durability. According to yet another embodiment, the drive train assembly 22 can be manufactured using a printer which prints in one or more 2D layers, for example. Many other methods of manufacture are possible.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A drive train assembly for an oral care device, the oral care device having a housing, the drive train assembly comprising:
   a plurality of elongated leaf spring assemblies symmetrically disposed around the circumference of the drive train assembly, wherein each of the plurality of elongated leaf spring assemblies comprises a leaf spring with a first segment, a second segment, and an additional segment, wherein the additional segment is disposed substantially orthogonal to the first segment and the second segment;
   a first end mount and a second end mount, wherein the plurality of elongated leaf spring assemblies are secured at a first end to the first end mount and at a second end to the second end mount; and
   a ring encircling the plurality of elongated leaf springs assemblies, wherein the ring is fixedly connected to each of the plurality of elongated leaf springs assemblies and configured to be fixedly connected to the housing of the oral care device.

2. The drive train assembly of claim 1, further comprising a transmission component configured to engage a brush head member.

3. The drive train assembly of claim 1, wherein the ring is fixedly connected to each of the plurality of elongated leaf springs at approximately a middle of a length of each leaf spring.

4. The drive train assembly of claim 1, wherein the plurality of leaf spring assemblies comprises three symmetrical leaf spring assemblies.

5. The drive train assembly of claim 1, wherein the plurality of elongated leaf springs comprise titanium.

6. The drive train assembly of claim 1, wherein the drive train assembly comprises a single integral component manufactured by 3D printing.

7. A 3D-printed drive train assembly comprising the drive train assembly of claim 1, further comprising:
   a transmission component extending from the second end mount and configured to engage a head member;
   wherein the ring encircling the plurality of elongated leaf spring assemblies, is fixedly connected to each of the plurality of elongated leaf spring assemblies at approximately the middle of the length of each leaf spring.

8. An oral care device comprising:
   a housing; and
   a drive train assembly comprising a plurality of elongated leaf spring assemblies symmetrically disposed around the circumference of the drive train assembly, wherein each of the plurality of elongated leaf spring assemblies comprises a leaf spring with a first segment, a second segment, and an additional segment, wherein the additional segment is disposed substantially orthogonal to the first segment and the second segment;
   a first end mount and a second end mount, wherein the plurality of elongated leaf spring assemblies are secured at a first end to the first end mount and at a second end to the second end mount; and
   a ring encircling the plurality of elongated leaf spring assemblies, wherein the ring is fixedly connected to each of the plurality of elongated leaf spring assemblies and fixedly connected to the housing of the oral care device.

9. The oral care device of claim 8, wherein the drive train assembly further comprises a transmission component configured to engage a brushhead assembly.

10. The oral care device of claim 8, wherein the ring is fixedly connected to each of the plurality of elongated leaf springs at approximately a middle of a length of each leaf spring.

11. The oral care device of claim 8 wherein the plurality of leaf springs comprises three symmetrical leaf spring assemblies.

12. The oral care device of claim 8 wherein the plurality of elongated leaf springs comprise titanium.

13. The oral care device of claim 8, wherein the drive train assembly comprises a single integral component manufactured by 3D printing.

14. A drive train assembly for an oral care device, the oral care device having a housing, the drive train assembly comprising:
   a plurality of elongated leaf spring assemblies symmetrically disposed around the circumference of the drive train assembly, wherein each of the plurality of elongated leaf spring assemblies comprises a leaf spring with a first segment and a second segment;

a first end mount secured directly to the first segment and a second end mount secured directly to the second segment; and a ring encircling the plurality of elongated leaf springs assemblies, wherein the ring is fixedly connected to each of the plurality of elongated leaf springs assemblies and configured to be fixedly connected to the housing of the oral care device.

* * * * *